Feb. 10, 1970 J. C. PRICE ET AL 3,495,234

ANALOG-TO-DIGITAL CONVERTER

Filed June 16, 1966 6 Sheets-Sheet 1

Inventors
JOHN C. PRICE
RYSZARD KITAJEWSKI
By Philip M. Bolton
Attorney

Feb. 10, 1970 J. C. PRICE ET AL 3,495,234

ANALOG-TO-DIGITAL CONVERTER

Filed June 16, 1966 6 Sheets-Sheet 2

Inventors
JOHN C. PRICE
RYSZARD KITAJEWSKI
By Philip M. Bolton
Attorney

Feb. 10, 1970 J. C. PRICE ET AL 3,495,234

ANALOG-TO-DIGITAL CONVERTER

Filed June 16, 1966 6 Sheets-Sheet 3

Inventors
JOHN C. PRICE
RYSZARD KITAJEWSKI
By Philip M. Bolton
Attorney

Inventors
JOHN C. PRICE
RYSZARD KITAJEWSKI
By Philip M. Bolton
Attorney

Inventors
JOHN C. PRICE
RYSZARD KITAJEWSKI
By Philip M. Bolton
Attorney

Feb. 10, 1970 J. C. PRICE ET AL 3,495,234

ANALOG-TO-DIGITAL CONVERTER

Filed June 16, 1966 6 Sheets-Sheet 6

Inventors
JOHN C. PRICE
RYSZARD KITAJEWSKI
By Philip M. Bolton
Attorney 3,495,234
ANALOG-TO-DIGITAL CONVERTER
John Clifford Price, Harlow, Essex, and Ryszard Kitajewski, Nazeling, Essex, England, assignors to International Standard Electric Corporation, New York, N.Y., a corporation of Delaware
Filed June 16, 1966, Ser. No. 558,007
Claims priority, application Great Britain, July 26, 1965, 31,805/65
Int. Cl. H04l 3/00; H03k 13/00
U.S. Cl. 340—347 9 Claims

ABSTRACT OF THE DISCLOSURE

An equilibrium coder wherein each input analog sample has superimposed thereon a damped oscillatory waveform of fixed initial amplitude and a predetermined rate of decay. The coder employs transistorized coding elements in parallel. Each coding element includes a current switching transistor pair to connect an associated constant current source to a common impedance. In the case of binary coding, each constant current source provides a current having twice the value of the current of the succeeding adjacent constant current source of the arrangement.

This invention relates to analog-to-digital converters and is applicable to encoders used in P.C.M. (pulse code modulation) systems.

The basis of many analog-to-digital converters is one or more bistable elements which produce the digital output. Example of such bistable elements are tunnel diodes, magnetic cores with a "square" hysteresis loop and multivibrator circuits.

In the copending U.S. patent application of A. H. Reeves, Ser. No. 366,778, filed May 12, 1964, now U.S. Patent No. 3,320,605, there is described an analog-to-digital converter in which a number of inter-connected bistable elements each having a different switching characteristic have applied to them an analog quantity together with a damped oscillatory waveform. Depending on the amplitude of the analog quantity certain of the bistable elements will be switched alternately from one condition to the other in succeeding cycles of the oscillatory waveform until the system comes to rest in a state of equilibrium, and the final condition of each bistable element represents the corresponding digit value. Such a device may conveniently be termed an "equilibrium coder."

According to the present invention there is provided an analog-to-digital converter including a plurality of interconnected bistable digital elements, each of which includes a current source and associated switching means arranged to connect the current source to an impedance common to all the coding elements, means for applying an amplitude sample of the analog quantity to be converted to the common impedance, the switching means associated with each coding element being responsive to a predetermined voltage across the common impedance so that the voltage/current characteristic of each coding element is a negative resistance characteristic.

In one embodiment of the invention each switching means is responsive to a function of the voltage across the common impedance and the voltage associated with the current of the constant current source.

Conveniently the switching means associated with each coding element includes a pair of transistors in a common emitter configuration with the common impedance connected in series between the collector of one of the transistors and the analog input (the base of one transistor being connected to a constant bias voltage source, the base of the other transistor being connected to the analog input via a phase reversing amplifier).

Figure 1:
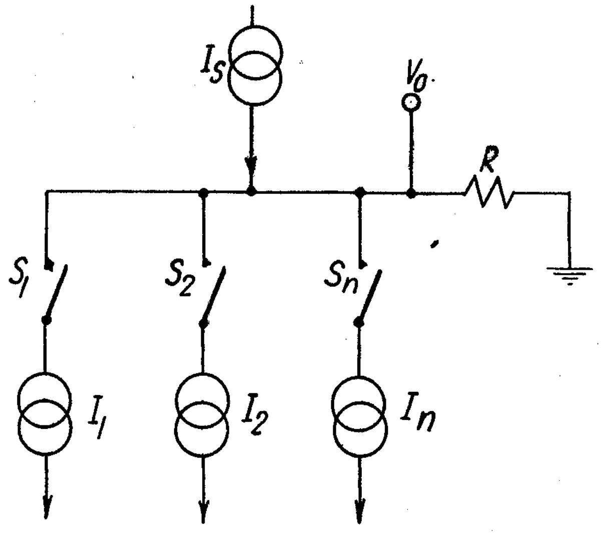
Figure 2B:
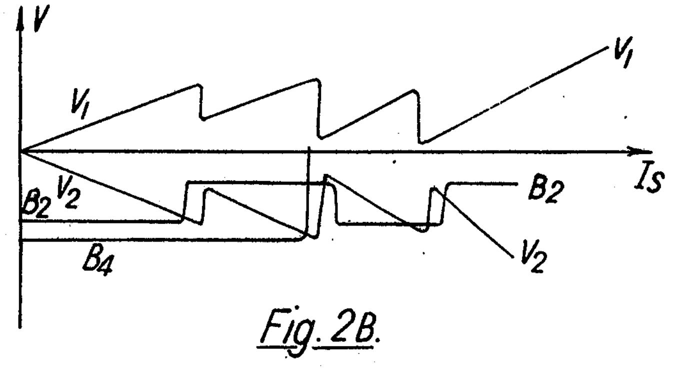
Figure 2A:
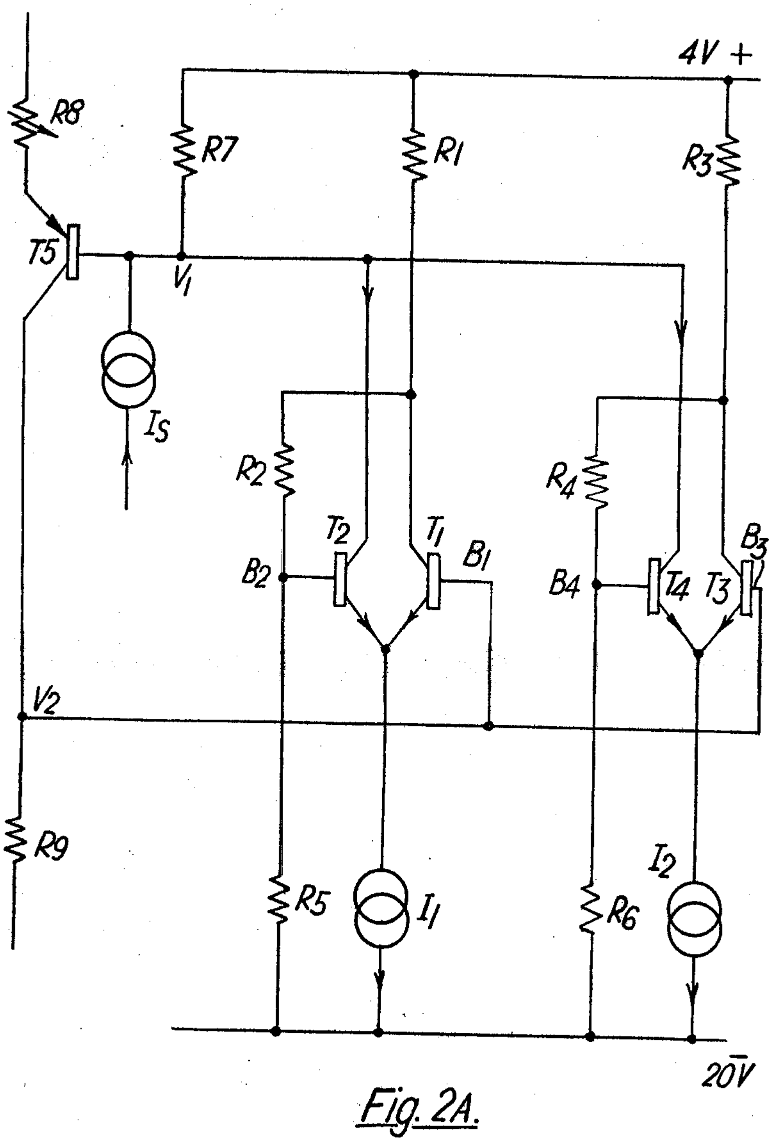
Figure 3:
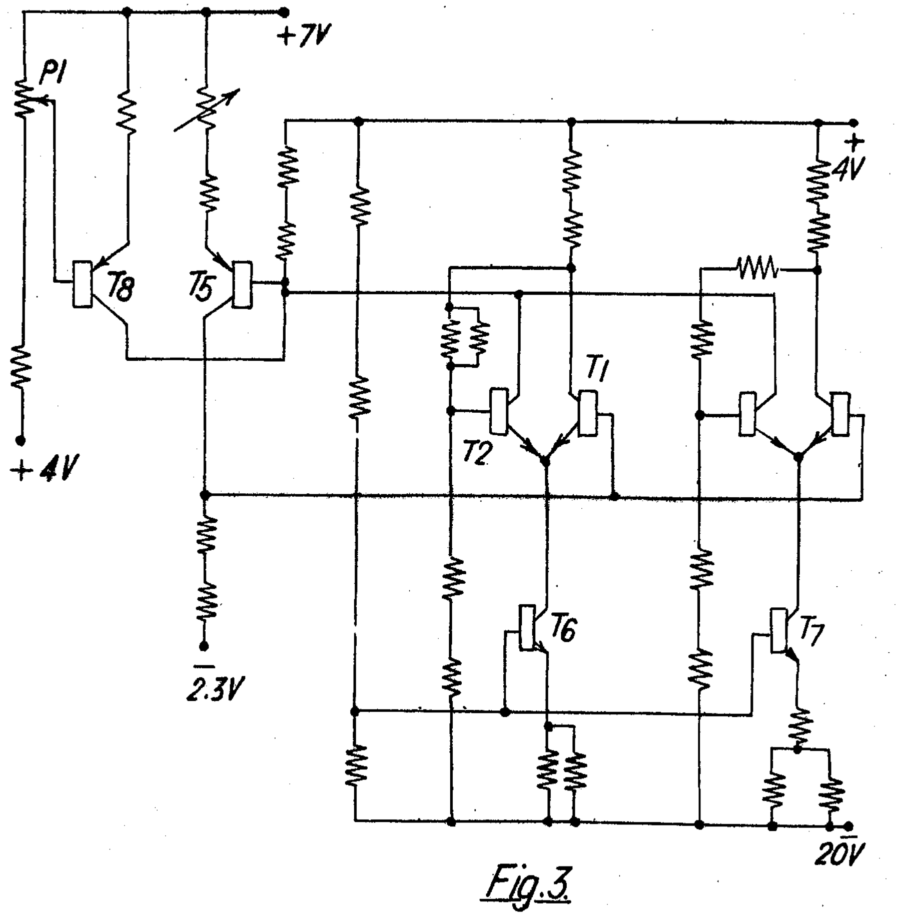
Figure 4:
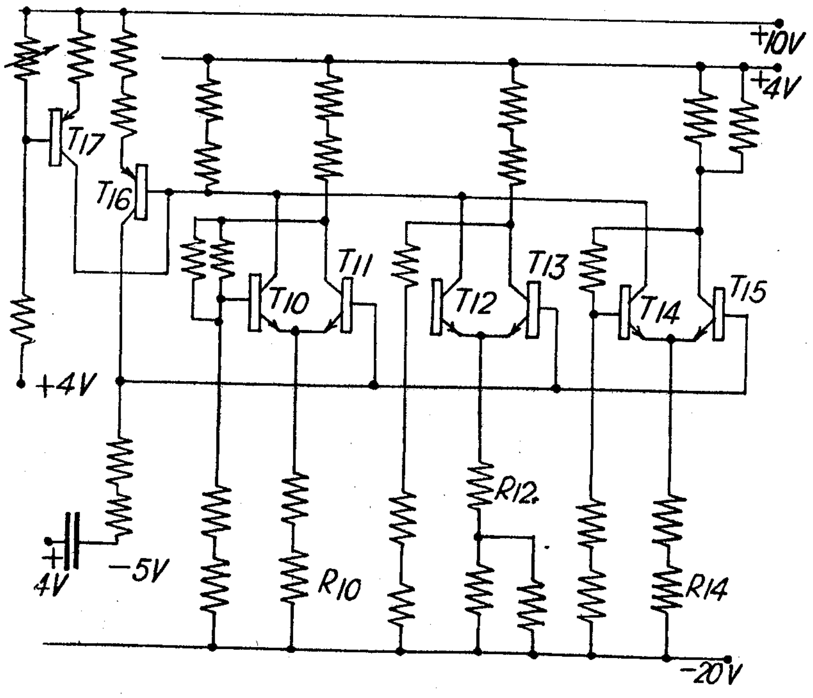
Figure 5A:
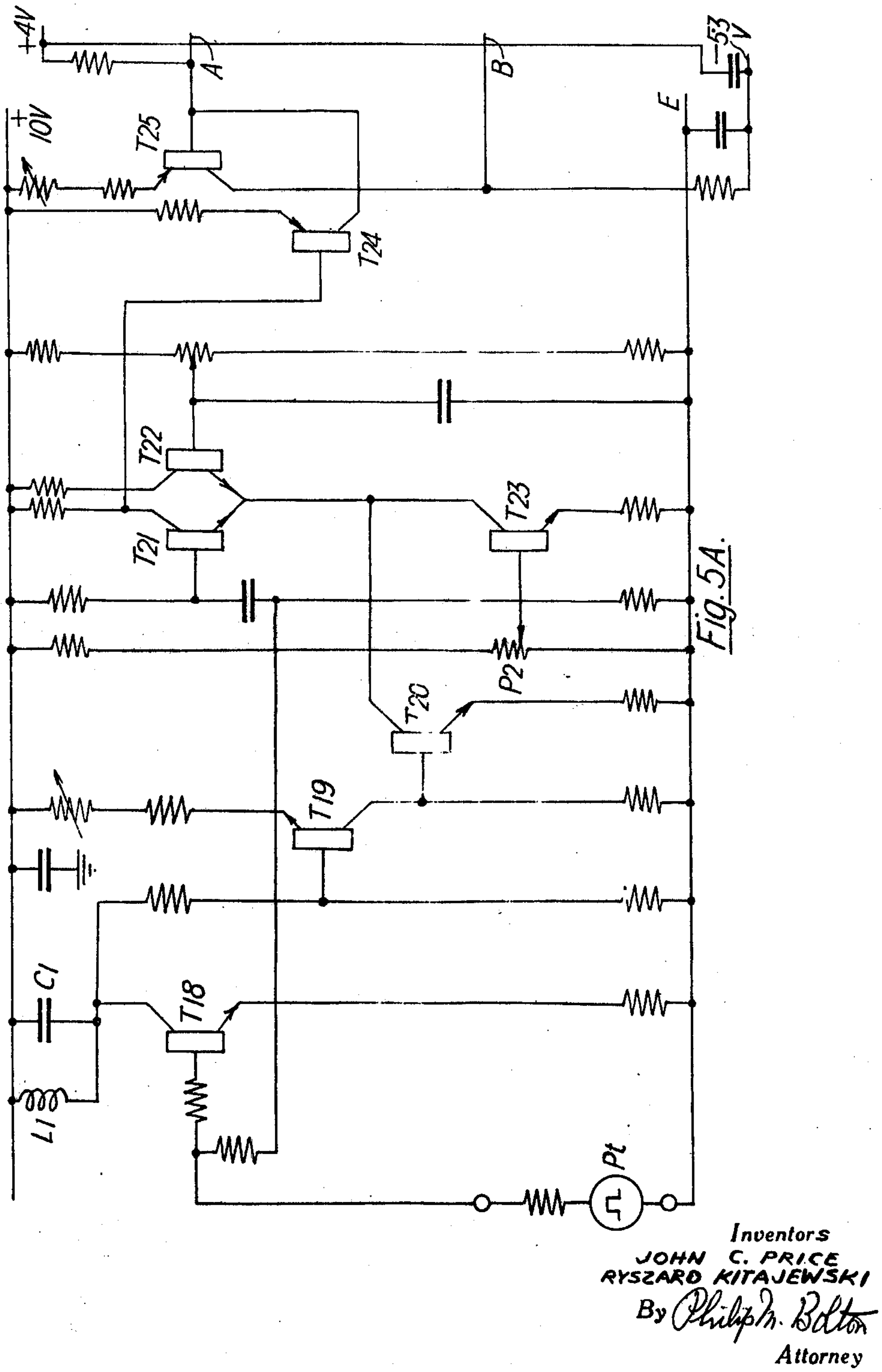
Figure 5B:
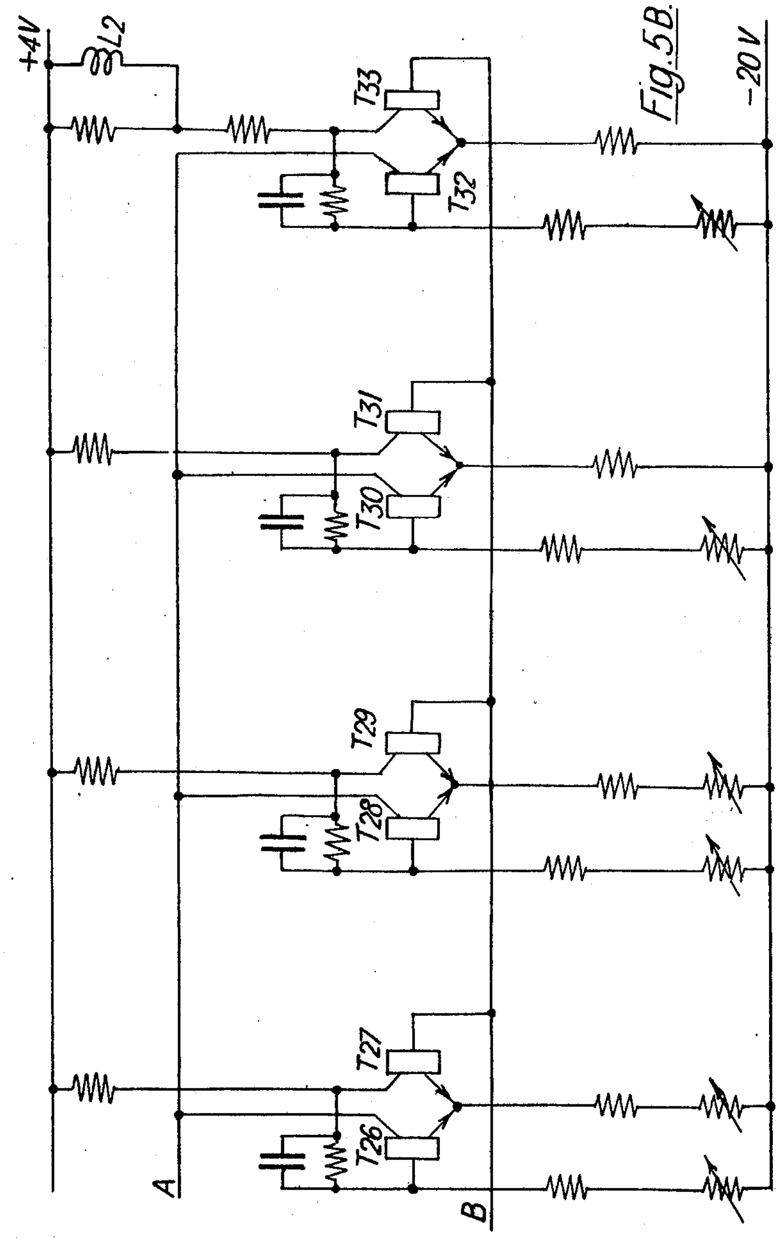

The above and other features of the invention will become more readily apparent and be better understood by reference to the following description of embodiments of the invention, taken in conjunction with the accompanying drawings in which FIG. 1 is a diagram illustrating the operation of a coding arrangement, FIG. 2A is a schematic circuit of a two-digit coder, FIG. 2B illustrates certain of the waveforms present in the circuit of FIG. 2A, FIG. 3 illustrates a practical circuit for a two-digit coder, FIG. 4 illustrates a practical circuit for a three-digit coder; and FIGS. 5A and 5B illustrates practical circuits for the driving and coding portions respectively of a four-digit coder.

The principle upon which the invention is based is that if a current $I_s$ flows into the diagrammatic circuit of FIG. 1 a combination of the weighting currents $I_1, I_2 \ldots I_n$, denoting the code, flow out to restore the equilibrium, i.e. substantially zero current will flow through the impedance R.

In the diagram of FIG. 1, the case is considered where a current $I_s$ of fixed amplitude flows into the network, and the fixed currents $I_1, I_2 \ldots I_n$ flow out of the network, singly or in combination, to restore equilibrium in the network. The net current into the network is indicated by a voltage $V_0$ across a small resistance R. The three current drains $I_1, I_2 \ldots I_n$ are each controlled by a switch $S_1, S_2 \ldots S_n$. Each switch is operated by a function of $V_0$ and $V_n$, a voltage associated with $I_n$. Conveniently this current switching is achieved by making each of the switches $S_1, S_2 \ldots S_n$ a current steering transistor pair.

A coder using two such switching arrangements is illustrated in FIG. 2A. A positive going signal current $I_s$ flows through R7 into the +4 v. bus, which corresponds to the node of FIG. 1. Resistance R7 in FIG. 2 corresponds to R in FIG. 1, and transistors T1, T2 and resistors R1, R2 and R5 form one bistable arrangement that can switch the $I_1$ current weight into R7. Transistors T3, T4 and resistors R3, R4 and R6 form a second bistable arrangement that can switch the $I_2$ current weight into R7. For a binary coding arrangement $I_2=2I_1$. Transistor T5 and resistors R8, R9 form a unity voltage gain phase-reversing amplifier that operates on $V_1$ to give $V_2$, which is applied to the common bases B1, B3 of the two bistable transistor pairs.

The action of the circuit is briefly as follows. V1 in FIG. 2B is drawn to one arbitrary level, and V2, B2 and B4 to another. Consider an input signal $I_s$ of slowly increasing value starting from zero. Initially the transistors T1 and T3 are conducting because the potential V2 exceeds that of B2 and B4 so no weighting current flows out of R7. With increasing $I_s$, V1 rises and V2 falls until it reaches B2 the base potential of T2. Then the $I_1$ bistable snaps over raising the potential of B2 to hold the bistable and subtracting $I_1$ from R7 to bring V1 down towards zero and V2 similarly up towards zero.

As $I_s$ increases further V1 rises again and V2 falls again until it reaches B4 the base potential of T4. Then the $I_2$ bistable snaps over raising the potential of T4 to hold on the bistable and subtracting $I_2$ from R7. This takes V1 in a negative direction and V2 in a positive direction until it reaches the potential of B2 and this turns off the $I_1$ bistable. Then the value of $I_s$ reached, is balanced by the two quanta subtracted by the $I_2$ weight, and V1 and V2 again move back towards zero. With further increase of $I_s$, V1 rises and V2 falls again until V2 reaches B2. Then the $I_1$ bistable comes on again to give the top level code.

A two-digit experimental model of the system is shown in FIG. 3. The desired values of threshold and backlash were set up independently for the two bistable. The circuit was then tested with a simple negative pulse drive and worked without adjustment to give adequate waveforms for the central region for each level.

The circuit was also tested with a variable D.C. source and was found to operate with the desired action.

The bistable pairs are as described for FIG. 2, and the constant current drains are provided by the transistors T6, T7. Transistor T5 provides a unity gain phase-reversing amplifier and the experimental analog signals are fed in via transistor T8 and the potentiometer P1. The operation of this coder is the same as for the circuit in FIG. 2.

It will be appreciated that for practical results the 4 levels coded by the circuits of FIG. 2 or FIG. 3 are not enough. For each additional bistable pair added to the circuit its coding capacity is doubled. Thus, in the arrangement shown in FIG. 4 a three digit coder capable of quantizing and coding 8 levels is illustrated.

Current switching is achieved by the transistor pairs T10, T11 and T12, T13, and T14, T15. The weighting currents $I_1$, $I_2$ and $I_3$ are provided by the simple resistance networks R10, R12 and R14. The three digit coder was operated experimentally with manually controlled input signals from transistor T17. Transistor T16 provides the phase-reversal amplifier. When a simple pulse amplitude modulated drive was substituted for the manual drive it was found necessary to alter slightly the values of some of the resistors to achieve correct coding at all 8 levels.

Finally a 16 level coder was built for inclusion in a log differential local area P.C.M. system, and this is illustrated in FIGS. 5A and 5B, FIG. 5B should be placed to the right of FIG. 5A to form a complete circuit diagram.

In the above-mentioned copending application, there is described the use of a damped oscillation superposed on the analog input. The use of a damped oscillation in equilibrium coding is practically attractive because it is difficult to do without some backlash in a bistable coding element. Reduction in backlash is coupled with a reduction in stability, not only in the present case where all the coding elements are connected in parallel, but also in the case where they are connected in series. The damped oscillation method of coding, which requires backlash, solves this problem and makes it easier to achieve bistability in the elements even with small weights.

Secondly, the use of a damped oscillation enables the timing of the setting up of the coding elements in their final position to be readily accomplished. For example, the elements can settle in order of precedence with the largest weight setting first. It is then possible to extract this timing and produce a serial output even though the coding elements are connected in parallel.

In the drive circuit shown in FIG. 5A transistor T18 is controlled by a timing pulse $P_t$ and shock excites the tuned network L1, C1 in its collector circuit. Transistor T19 is a D.C. amplifier and transistor T20 provides a high impedance source of damped oscillations to feed the emitters of the gate formed by transistors T21, T22. For test purposes the signal input to the base of transistor T23 is a manually variable D.C. signal provided by the potentiometer P2. In practice the resistor R15, which provides the D.C. source for the test signal, is removed and the potentiometer P2 would be connected instead to the analog source to be coded. The gated and quantized signal together with the superposed oscillation is fed from the collector of T21 to transistor T24 which provides a high impedance drive to the coder section shown in FIG. 5B, via the connection A. Transistor T25 forms the phase reversing amplifier for the coder section in FIG. 5B.

The coder section in FIG. 5B consists basically of four bistable pairs of transistors T26, T27; T28, T29; T30, T31 and T32, T33 connected in parallel to the input signal on connection A. The constant current sources for each bistable pair are provided by simple resistance networks, which may or may not include manually variable resistances to provide a means of altering the current values to obtain optimum results. To obtain good bistability in the digit with the smallest weight a small inductance L2 is included in the collector of that stage to give increased high frequency feedback.

The operation of this circuit is exactly the same as that described for FIG. 2, except that it is extended now to 16 levels instead of 4 levels. However, the description of the operation of FIG. 2 was in terms of an amplitude sample alone being applied to the coding elements. The question of whether or not a bistable element is "on" depends on a voltage (or current) threshold. If, in addition to this threshold a timing control is introduced the circuit is no longer solely dependent on voltage (or current) and there is greater freedom in the choice of threshold. This enables improved tolerances and linearity to be achieved. The practical form of time control which can be used in all the above circuits is the damped oscillatory waveform disclosed in the above-mentioned copending application. This time control is included in FIG. 5A, as previously mentioned, and the input to the coding section is thus a combination of an analog amplitude sample and a superposed damped oscillatory waveform.

It is to be understood that the foregoing description of specific examples of this invention is made by way of example only and is not to be considered as a limitation on its scope.

What we claim is:

1. An analog-to-ditigal converter comprising:
- a plurality of interconnected bistable coding elements;
- an impedance coupled in common to all of said coding elements;
- a source of amplitude samples of the analog quantity to be converted;
- each of said coding elements including
  - a current source, and
  - a switching means to couple said current source to said common impedance; and
  - first means coupled to said source to couple said amplitude samples to said common impedance;
  - each of said switching means being responsive to a predetermined voltage across said common impedance so that the voltage-current characteristic of each of said coding element is a negative resistance characteristic;
  - said first means including
    - means to produce a damped oscillatory waveform of fixed initial amplitude and a predetermined rate of decay for each of said samples; and
    - means to superimpose each of said samples on its associated one of said oscillatory waveform.

2. A converter according to claim 1, wherein the current produced by each of said current sources is twice the current produced by the next succeeding one of said current sources.

3. A converter according to claim 1, wherein each of said coding elements are interconnected in parallel with respect to each other.

4. A converter according to claim 1, wherein each of said switching means is responsive to a function of the voltage across said common impedance and the voltage associated with the current of said current source.

5. A converter according to claim 1, wherein each of said current source are constant current sources producing different predetermined values of current.

6. A converter according to claim 5, wherein each of said constant current sources produce a current twice the value of the current produced by the next succeeding one of said constant current sources.

7. A converter according to claim 1, wherein each of said switching means include a pair of transistors connected in a common emitter configuration, the collector of one of said pair of transitors being coupled to said common impedance and said first means.

8. A converter according to claim 7, further including a constant bias voltage source coupled to the base of said one of said pair of transistors, and a phase reversing amplifier coupling the base of the other of said pair of transistor to said first means.

9. A converter according to claim 1, wherein each of said coding elements are connected in parallel with respect to each other; each of said current sources include a constant current source producing a current twice the value of the current produced by the next succeeding one of said constant current source; and each of said switching means include a pair of transistors connected in a common emitter configuration, the collector of one of said pair of transistors being coupled to said common impedance and said first means; and further including a constant bias voltage source coupled to the base of said one of said pair of transistors, and a phase reversing amplifier coupling the base of the other of said pair of transistors to said first means.

References Cited

UNITED STATES PATENTS

| | | | |
|---|---|---|---|
| 2,688,441 | 9/1954 | Merrill et al. | 340—347 |
| 2,931,024 | 3/1960 | Slack | 340—347 |
| 3,320,521 | 1/1966 | Davis | 340—347 |
| 3,247,507 | 4/1966 | Moses | 340—347 |
| 3,309,693 | 3/1967 | Davis | 340—347 |

MAYNARD R. WILBUR, Primary Examiner

JEREMIAH GLASSMAN, Assistant Examiner